US005429401A

United States Patent [19]

Youmans

[11] Patent Number: 5,429,401

[45] Date of Patent: Jul. 4, 1995

[54] ANGLED TONGS

[76] Inventor: Carol E. Youmans, 4179 Bond Street, Burnaby, British Columbia, Canada, V5H 1G1

[21] Appl. No.: 304,619

[22] Filed: Sep. 12, 1994

Related U.S. Application Data

[63] Continuation of Ser. No. 66,928, May 26, 1993, abandoned, which is a continuation of Ser. No. 877,218, May 1, 1992, abandoned.

[30] Foreign Application Priority Data

May 7, 1991 [CA] Canada .............................. 2041999

[51] Int. Cl.[6] ........................ A01K 29/00; B25B 7/02

[52] U.S. Cl. .............................. 294/1.4; 294/99.1; 294/118

[58] Field of Search .................... 294/1.3, 1.4, 8.5, 11, 294/16, 19.1, 50.6, 50.7, 50.8, 99.1, 99.2, 118, 119

[56] References Cited

U.S. PATENT DOCUMENTS

| | | | |
|---|---|---|---|
| 117,297 | 7/1871 | Jones | 294/50.8 |
| 346,136 | 7/1886 | Towner | 294/118 |
| 370,514 | 9/1887 | Wygant | 294/50.8 |
| 381,581 | 4/1888 | Ricketson | 294/50.8 |
| 383,629 | 5/1888 | Coon | 294/50.7 X |
| 418,913 | 1/1890 | Drexler | 294/118 |
| 716,082 | 12/1902 | McKinly | 294/118 |
| 818,465 | 4/1906 | Price | 294/118 X |
| 1,763,437 | 6/1930 | Munklewitz | 294/118 |
| 2,291,822 | 8/1942 | McSherry | 294/50.8 |
| 2,489,580 | 11/1949 | Marcoux | 294/118 |
| 3,628,818 | 12/1971 | Pittman | 294/118 |
| 3,636,954 | 1/1972 | Weston | 294/99.2 X |
| 3,692,347 | 9/1972 | Bixler . | |
| 3,778,097 | 12/1973 | Dorzan . | |
| 3,809,421 | 5/1974 | James . | |
| 3,977,715 | 8/1976 | Casci | 294/99.2 X |
| 4,079,765 | 3/1978 | Hatayan | 294/99.2 X |
| 4,165,745 | 8/1979 | Heifetz | 294/99.2 X |
| 4,194,777 | 3/1980 | Carns . | |
| 4,248,465 | 2/1981 | Halstead | 294/19.1 X |
| 4,559,853 | 12/1985 | Oye | 294/118 X |
| 4,575,143 | 3/1986 | Nast | 294/19.1 X |
| 4,828,309 | 5/1989 | Germaine | 294/50.6 X |
| 4,953,347 | 9/1990 | Siegfried | 294/50.8 X |
| 4,991,386 | 2/1991 | Dirksen | 294/50.8 X |
| 5,143,414 | 9/1992 | Rosellini | 294/99.2 |

*Primary Examiner*—Dean Kramer

*Attorney, Agent, or Firm*—Murray E. Thrift; Adrian D. Battison; Stanley G. Ade

[57] ABSTRACT

An apparatus is provided for grasping objects. It is particularly useful for grasping objects on the ground with the user in a standing position. The apparatus has particular utility in picking up animal droppings. it consists of two long arms with long, rigid handles and shorter, resilient shanks that cross and are pivotally connected to one another where they cross. Adjacent the pivot, each shank carries an object grasping head. When the heads are in engagement and the shanks are undeformed, the handles diverge so that the handles can be brought together to provide considerable force for grasping a thin-walled object such as a can, bag or the like. When the handles are brought together, they may be held in place using a loop of thong on one of the handles.

6 Claims, 3 Drawing Sheets

ANGLED TONGS

This application is a continuation of application Ser. No. 08/066,928, filed May 26, 1993, now abandoned which is a continuation of Ser. No. 07/877,218 filed May 1, 1992, now abandoned.

FIELD OF THE INVENTION

The present invention relates to an object grasping appliance and more particularly to a pair of tongs suitable for grasping objects that are normally difficult to handle.

BACKGROUND

The present invention has particular, although not exclusive, utility in the handling of pet droppings. The tools now available for picking up animal droppings are not fully satisfactory for various reasons. These include a requirement for the user to stoop to use the tool and the inability of the tool to pick up the droppings cleanly. Soft droppings are a particular problem with most known devices. With less than ideal ground conditions, the known devices are particularly unsatisfactory.

The present invention is concerned with a novel apparatus capable of handling pet droppings and other materials efficiently and cleanly.

SUMMARY

According to the present invention there is provided an apparatus for grasping objects comprising two elongate arms, an object engaging head on each arm at a distal end thereof and pivot means connecting the arms adjacent the distal ends of the arms, the arms being resilient adjacent the pivot means and having elongate handle portions extending from the pivot means to proximal ends of the arms, the handle portions diverging away from the pivot means when the heads engage one another with the arms unstrained, each handle portion having a length that is a plurality of times greater than the distance from the pivot to the distal ends of the arms.

Because of the large mechanical advantage of the arms and the divergence of the handles, it is possible to control the positioning of the pick-up heads very accurately, so that even soft objects may be picked up for disposal without difficulty. The long handles also allow the apparatus to be used from a standing position.

The resiliency of the arms adjacent the pivot makes it possible to grasp an object between the heads and to bring the handles together to grasp the object with considerable force. The handles can then be held together, for example with a thong or latch, to retain the object. This is particularly useful for carrying or storing a container such as a can for holding waste material picked up.

BRIEF DESCRIPTION OF THE DRAWINGS

In the accompanying drawings, which illustrate exemplary embodiments of the present invention.

DETAILED DESCRIPTION

Figure 1:
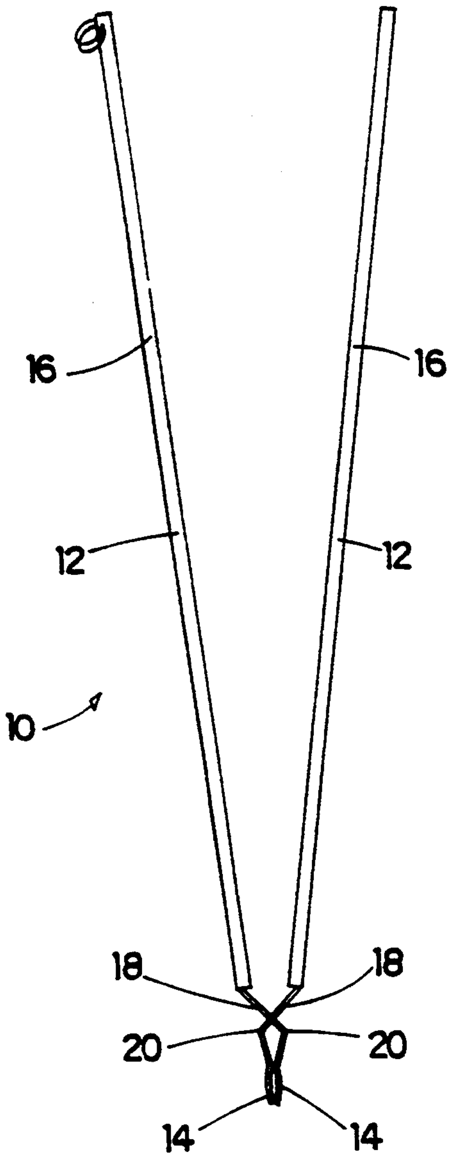
FIG. 1 is a front elevation of an apparatus according to the present invention.
Figure 2:
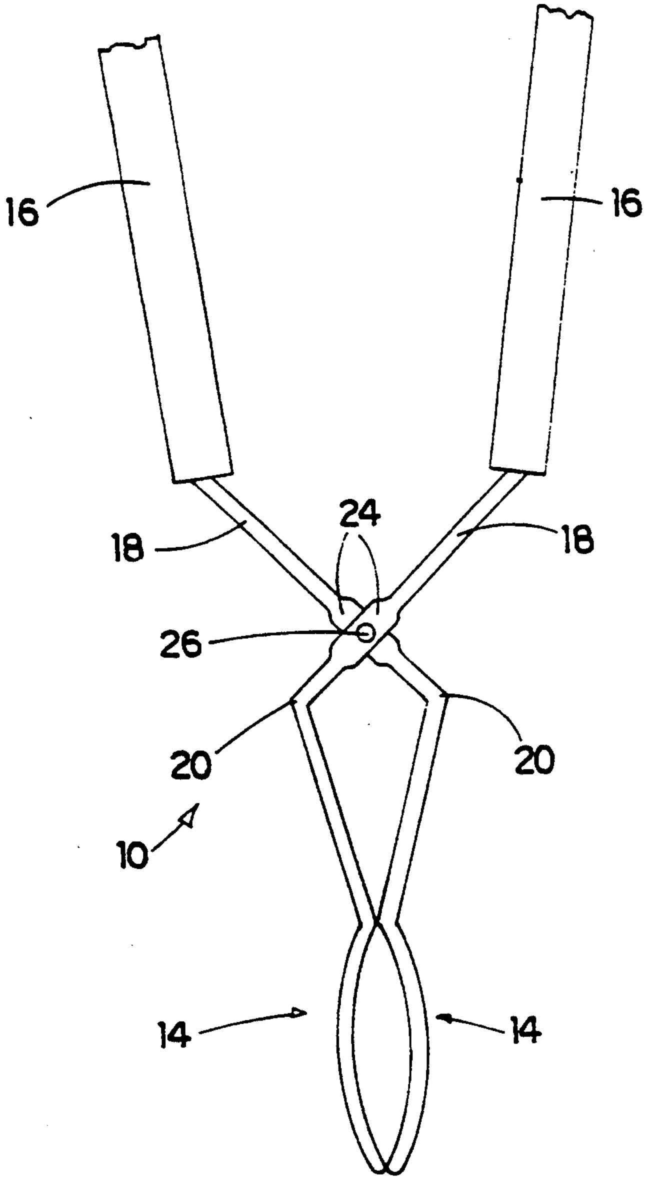
FIG. 2 is a front elevation of the distal portion of the apparatus.
Figure 3:
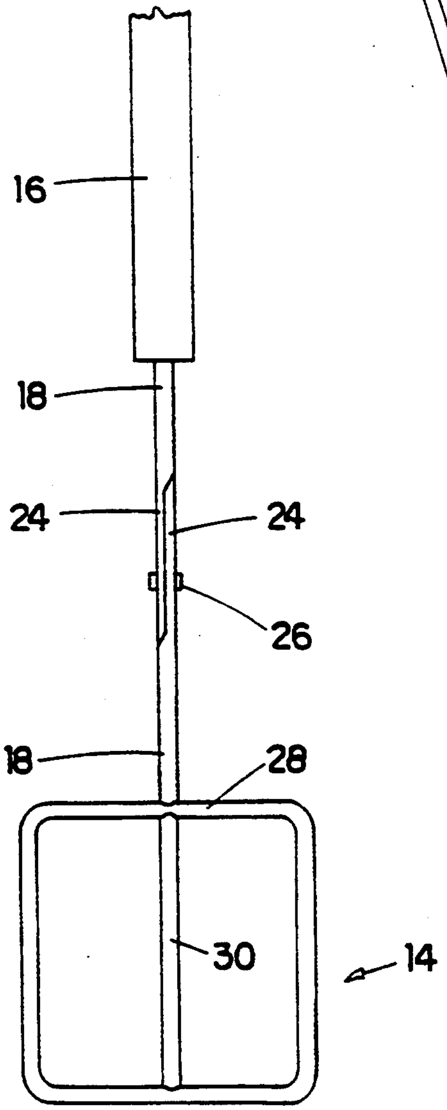
FIG. 3 is a side elevation of the distal portion of the apparatus.

Referring to the accompanying drawings, and especially to FIGS. 1, 2 and 3, there is illustrated an object grasping apparatus 10 constructed according to the present invention. The apparatus has two elongate arms 12, each with a pick up head 14 at a distal end and a long, rigid handle 16 extending to the proximal end. Between the handle and the head, the arm has a resilient shaft 18 projecting from the end of the arm at an obtuse angle. Partway along this length, the shaft has a bend 20 that is slightly sharper than the obtuse angle between the shaft and the handle. Between the bend 20 and the handle 16, the shaft 18 has a flattened section 24.

The flattened sections 24 of the two shafts engage one another as illustrated most particularly in FIGS. 2 and 3 and are pivotally connected with a rivet 26.

In this exemplary embodiment, each arm has an overall length of approximately 38 inches. The handle 16 is approximately 34 inches in length and the distance from the end of the handle to the rivet 26 is approximately 1 inch.

As illustrated most particularly in FIG. 3, each head consists of a rectangular metal loop 28 fixed to the end of the shaft 18. A cross member 30 extends across the loop, midway between the sides, parallel to the adjacent portion of the shaft 18.

At the proximal end of one of the arms 12, the handle 16 carries two thong loops 32 and 34.

Figure 4:
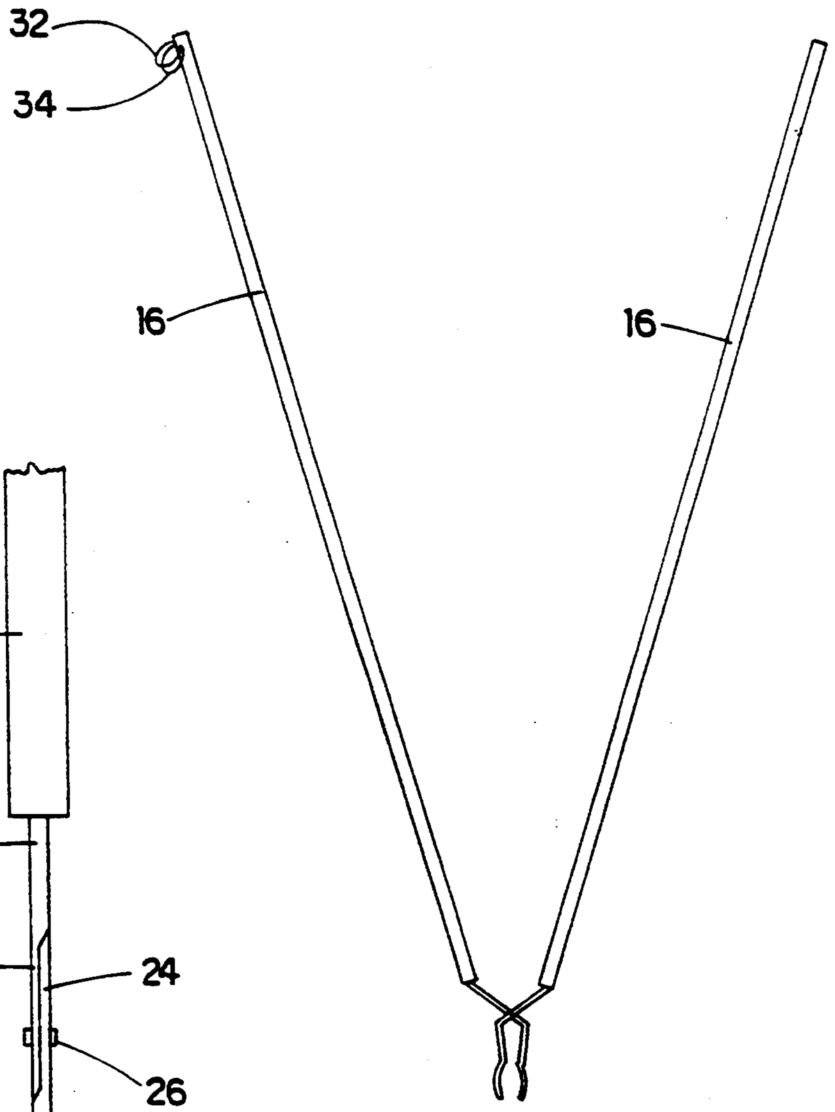
FIG. 4 illustrates the apparatus in an open condition.
Figure 5:
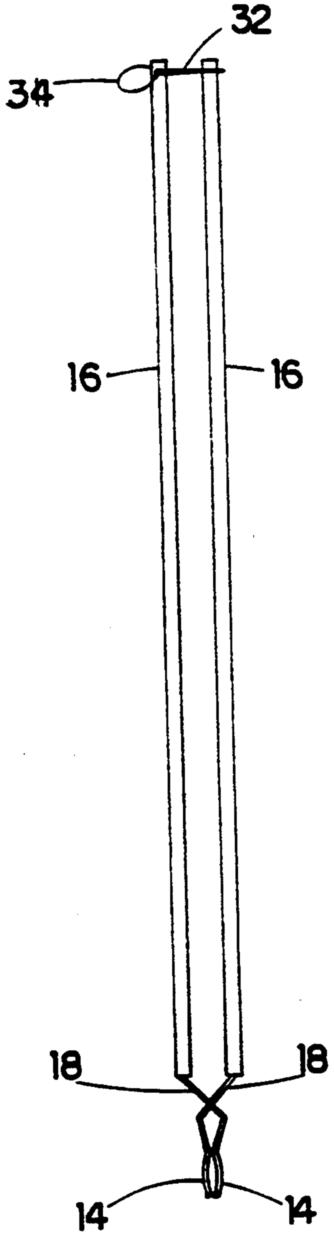
FIG. 5 illustrates the apparatus in a closed condition.
Figure 6:
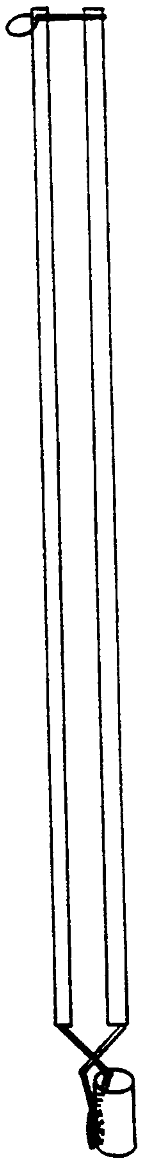
FIG. 6 illustrates the stored condition of the apparatus in association with a container.

The open condition of the apparatus is illustrated in FIG. 4. In this condition, the heads 14 are separated to grasp an object. The object is grasped by bringing the proximal ends of the two handles 16 towards one another. The relatively large mechanical advantage provided by the long handles allows a very precise positioning of the heads so that very delicate objects can be picked up. At the same time, considerable force can be applied to an object, where this is desired. In the fully closed condition illustrated in FIG. 5, the heads are in engagement and the handles have been brought together, thus resiliently deforming the shafts 18 of the two arms. The apparatus can be retained in this condition using one of the thongs 32 and 34, with the other thong being used where desired for hanging the apparatus from a hook or nail on a wall. With the apparatus in this closed condition, it is possible to firmly grip a thin-walled object, for example a can, for transportation purposes as illustrated in FIG. 6. Thus, where animal droppings are to be picked up, a can be grasped by the apparatus and transported to the site of use, where it can be put down and used as a container for the animal droppings. This procedure is repeated until all sites are cleaned. The can may then be transported to a disposal site, all without the need for the operator to bend over or handle either the droppings or the can containing them.

Figure 7:
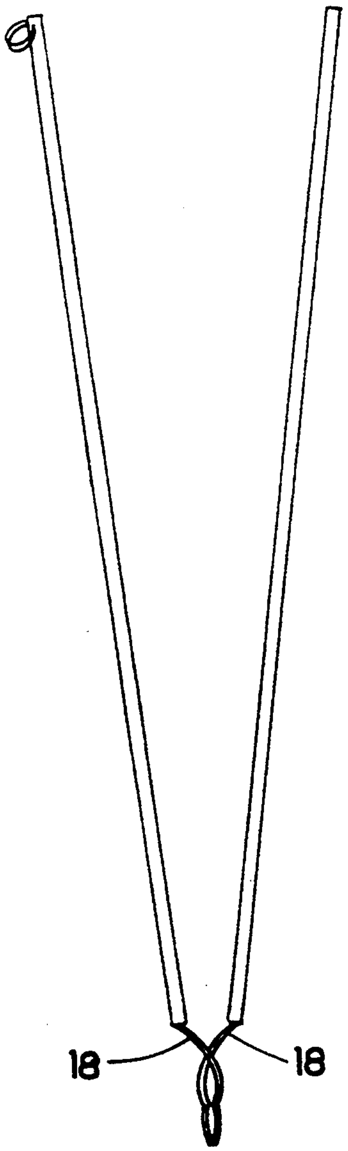
FIG. 7 is a front elevation of an alternative embodiment of the invention.

An alternative embodiment of the apparatus is illustrated in FIG. 7. In this embodiment, the shaft 18 of each handle is bowed outwardly between the pivot and the head. This provides resiliency in the bowed section of the shaft and allows the operator to grasp bulky objects between the bowed shaft sections.

The apparatus according to the invention may be used for handling a wide variety of objects and materials. For example, it can be used for grasping and carrying buckets, bags and bundles of loose materials such as yard refuse. Examples of the latter are leaves, weeds, paper litter et cetera. The apparatus may be used to grasp and pull weeds from garden soil. The apparatus may also be used to pick up objects from the ground, from overhead or from any desired position.

While particular embodiments of the present invention have been described in the foregoing, it is to be understood that other embodiments are possible within the scope of the invention. The invention is to be considered limited solely by the scope of the appended claims.

I claim:

1. An apparatus for grasping objects comprising two elongate arms, each having proximal and distal ends, an object engaging, substantially rigid head on each arm at the distal end thereof, the arms crossing one another adjacent the distal ends of the arms, and a single pivot connecting the arms where the arms cross for relative pivotal movement of the arms about the pivot, the arms being unconnected between the pivot and the distal ends of the arms and unconnected between the pivot and the proximal ends of the arms, the arms having independent elongate handle portions extending from positions spaced from the pivot to the proximal ends of the arms, each handle portion having a length that is a plurality of times greater than the distance from the pivot to the distal ends of the arms, and the arms being resilient between the pivot and the proximal ends thereof, the handle portions diverging from the pivot to the proximal ends of the arms in a closed position of the tongs when the heads engage one another with the arms unstrained, and the resiliency of the arms being sufficient that the arms may be resiliently deformed between the pivot and the handle portions thereof to bring the handle portions into substantially parallel positions when the proximal ends of the handle portions are urged towards one another from said closed position.

2. An apparatus according to claim 1 wherein each handle portion comprises a rigid handle extending from the proximal end of arm toward the pivot.

3. An apparatus according to claim 2 wherein those portions of the arms other than the handles are resiliently bendable.

4. An apparatus according to claim 1 including means for selectively connecting the proximal ends of the arms at positions adjacent one another, with the remainder of the arms resiliently deformed.

5. An apparatus according to claim 1 wherein each object engaging head comprises a rectangular loop and a crossbar extending there across.

6. An apparatus according to claim 1 in combination with a container having a side wall selectively engaged between the object engaging heads of the apparatus.

* * * * *